United States Patent [19]

Barnes et al.

[11] 4,247,685

[45] Jan. 27, 1981

[54] CONTINUOUS BULK POLYMERIZATION OF 2-PYRROLIDONE

[76] Inventors: Carl E. Barnes, 482 Trinity Pass, New Canaan, Conn. 06840; Arthur C. Barnes, 320 Stamford Ave., Stamford, Conn. 06902

[21] Appl. No.: 114,229

[22] Filed: Jan. 21, 1980

Related U.S. Application Data

[63] Continuation-in-part of Ser. No. 039,773, May 17, 1979, which is a continuation-in-part of Ser. No. 899,066, Apr. 24, 1978, abandoned.

[51] Int. Cl.³ .................. C08G 69/20; C08G 69/46
[52] U.S. Cl. .................. 528/313; 264/232; 264/340; 528/315; 528/319; 528/326
[58] Field of Search .......... 528/313, 315, 319, 326; 264/232, 340

[56] References Cited

U.S. PATENT DOCUMENTS

| 2,638,463 | 5/1953 | Ney et al. | 528/326 |
|---|---|---|---|
| 2,809,958 | 10/1957 | Barnes et al. | 528/326 |
| 2,973,343 | 2/1961 | Ney | 528/326 |
| 3,060,153 | 10/1962 | Follett | 528/326 |
| 3,069,392 | 12/1962 | Clark et al. | 528/326 |
| 3,174,951 | 3/1965 | Taber | 528/326 |
| 3,681,293 | 8/1972 | Jarovitzky et al. | 528/326 |
| 3,721,652 | 9/1970 | Barnes | 528/326 |
| 3,804,813 | 4/1974 | Takamiya et al. | 528/326 |
| 3,835,100 | 9/1974 | Sekiquchi et al. | 528/326 |
| 4,098,774 | 7/1978 | Bacskai | 528/315 |

*Primary Examiner*—Harold D. Anderson

[57] ABSTRACT

A process for forming polymers of 2-pyrrolidone in pellet form via bulk polymerization is disclosed. Polymerization accelerators are empoyed to markedly shorten the polymerization time thus making possible a compact continuous polymerization apparatus which produces pellets of high polymer content requiring no further polymerization. The pellets are formed by forcing the polymerizing mixture through small tubes to form rods of polymer which are then cut into short lengths.

8 Claims, 1 Drawing Figure

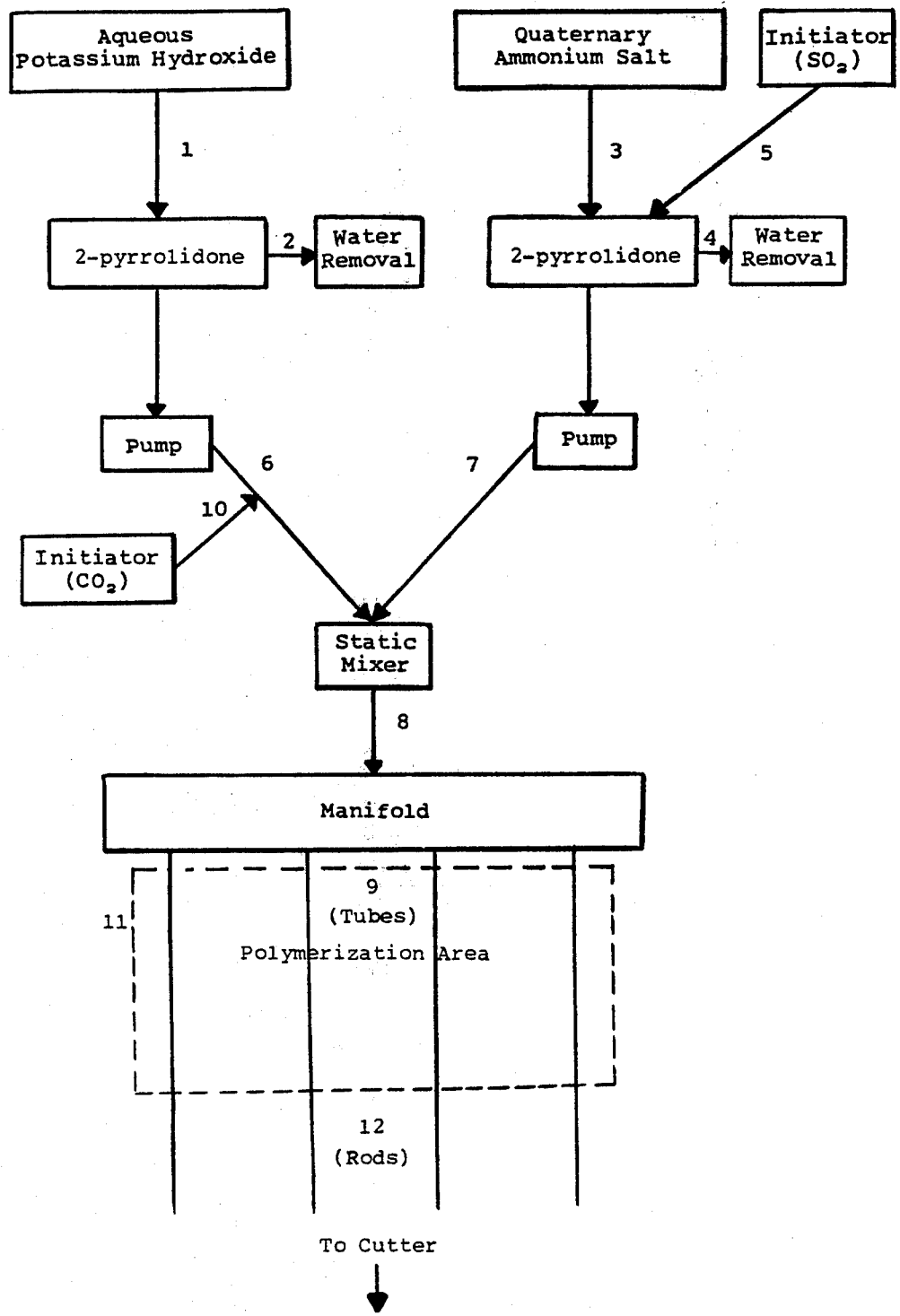

CONTINUOUS BULK POLYMERIZATION OF 2-PYRROLIDONE

RELATED APPLICATIONS

This application is a continuation-in-part of co-pending application Ser. No. 039,773 filed May 17, 1979 which in turn is a continuation-in-part of application Ser. No. 899,066 filed Apr. 24, 1978, now abandoned.

BACKGROUND OF THE INVENTION

This invention relates to the polymerization of 2-pyrrolidone and more particularly to the formation of pellets of this polymer by means of a continuous bulk polymerization process.

The polymerization of 2-pyrrolidone using an alkali metal salt of 2-pyrrolidone as a catalyst combined with a co-catalyst or "activator" under anhydrous conditions is well known in the art. Relative prior art is recited in our co-pending application Ser. No. 039,773. Most of the prior art disclosed methods of polymerization which are known as "bulk polymerization" resulting in the formation of an exceptionally hard and tough polymer cake which is very difficult to comminute. A method commonly employed is to grind the polymer cake in a Wiley mill or similar larger grinder. This is not only very expensive but the cake is so hard that it breaks particles of steel from the blades of the grinder thus introducing metal particles into the ground polymer which interfere with subsequent operations such as melt spinning through the tiny holes of a spinnerette to form fibers.

Some attempts to avoid this grinding step by forming pellets directly via bulk polymerization have been disclosed in the prior art. Thus U.S. Pat. No. 3,681,293 discloses a method of extruding the partially polymerized mass while still soft, cutting the extruded soft rod into pellets and then further polymerizing the pellets. U.S. Pat. No. 3,804,813 discloses a similar method in which the partially polymerized mass is cut into small pieces which are then further polymerized. Such methods in actual practice are virtually inoperable because it is difficult or impossible to carry out the various steps of the operation in the complete absence of moisture with the result that the further polymerization of the pellets does not occur since contact with even small amounts of water vapor stops the polymerization reaction. It is therefore essential that the bulk polymerization be carried out in a completely sealed apparatus until a conversion of 50 percent or more is reached before exposure to the atmosphere. Pellets having this polymer content are suitable for any subsequent use. The unpolymerized monomer may be recovered readily in the washing step which is necessary to remove the alkali. To facilitate washing it is desirable that the polymerization be stopped at about 50 to 60 percent rather than allow it to procede to maximum conversion.

Attempts have been made by us in the past to carry out the polymerization of 2-pyrrolidone continuously in small tubing completely sealed from the atmosphere using metal tubing coated with a low-friction material such as polytetrafluoroethylene ("Teflon") or by using Teflon or polyethylene tubing. The intention was to keep the polymerizing mass continuously moving through the tubing until a solid rod was formed which would emerge from the end. The difficulty encountered was that the residence time in the tubing was of necessity so long to reach even 40 percent conversion that the method became impractical. Not only were very long lengths of tubing required but the resistance to flow in such long lengths made the system inoperable. To make matters even worse, the polymerizing mass characteristically passes through a sticky plastic phase in the earlier stages of the polymerization which contributes greatly to the resistance to flow.

It is an object of this invention to provide a method of increasing the polymerization rate to such a degree that only relatively short lengths of tubing are required to provide the necessary residence time.

It is a further object of the invention to provide a method of minimizing the duration of the sticky plastic phase which normally occurs during the polymerization so that it is no longer a problem.

Other objects will be apparent in the detailed disclosure which follows.

SUMMARY OF THE INVENTION

We have discovered that by using the polymerization accelerators disclosed in our co-pending application Ser. No. 039,773 that the residence time is shortened to the point where relatively short lengths of tubing may be used in the continuous rod polymerization method. Also the use of the proper accelerators results in minimizing the duration of the plastic sticky phase resulting instead in the rapid formation of a gel with relatively low adhesion.

By following the polymerization procedure disclosed in Example 8 of the above referred to application, the total time required for a conversion of about 60 percent is only about 60 minutes compared to 24 hours or more for only about 40 percent conversion by older methods. This cuts the length of tubing required by at least 1/24 thus making this continuous polymerization method practical.

DETAILED DESCRIPTON OF A PREFERRED EMBODIMENT

Referring to the drawing which is a flow diagram of the process, the invention is practiced by first forming the alkali metal salt of 2-pyrrolidone, preferably the potassium salt, by by adding an aqueous solution of the alkali metal hydroxide to 2-pyrrolidone (line 1) and distilling off the water under vacuum until the solution is anhydrous (line 2). This is best insured by distilling over up to about 10 percent of the 2-pyrrolidone whereby all the water is removed. It is preferred to form a solution of about 8 to 10 percent of the alkali metal pyrrolidonate (conveniently referred to as the "K-salt" solution).

Next an anhydrous solution containing preferably about 2 to 3 mol percent of the quaternary ammonium salt ("Q-salt") is prepared by adding the hygroscopic compound, preferably tetra n-butyl ammonium bisulfate or methyl tri n-butyl ammonium sulfate, to 2-pyrrolidone (line 3) and distilling over, under vacuum, about 10 percent of the pyrrolidone (line 4). In a plant operation both these steps, i.e. the preparation of the K-salt solution and the Q-salt solution may be advantageously carried out in wiped film evaporators as a continuous process.

The polymerization initiator, if it is $SO_2$, may be added to the Q-salt solution (line 5) in which it is soluble (this solution containing $SO_2$ is stable for several days and hence may be stored in a holding tank if desired). The K-salt and Q-salt solutions are then pumped continuously (lines 6 and 7) through a static mixer into a manifold (line 8). The two solutions are pumped at essentially the same rate although the speed of either pump may be varied slightly for purposes of optimization. The volume of the manifold should be small in order to insure that the dwell time of the mixture is short thus avoiding the build up of polymer.

If the initiator to be used is $CO_2$ it cannot be added to the Q-salt solution since it is not soluble in it but must be bled into the K-salt flow line (line 10). Alternatively the $SO_2$ may be added at this point instead of being dissolved in the Q-salt solution.

The final mixture in the manifold then consists of an anhydrous 2-pyrrolidone solution containing about 4 to 5 mol percent of K-salt and about 1 to 1.5 mol percent of Q-salt together with the polymerization initiator which is preferably present in about 0.005 mol of $SO_2$ per mol of 2-pyrrolidone or about 0.03 mol of $CO_2$ per mol of 2-pyrrolidone.

From the manifold the pressure forces the polymerization mixture into the tubing lines (9) attached to the manifold where polymerization takes place. The tubing lines may be stainless steel coated with a low friction material such as Teflon or a silicone or may be simply Teflon or polyethylene tubing. An inside diameter of about ⅛ inch is preferred since this size rod when cut into pellets is ideal both for the washing step and for feeding to an extruder after drying. The tubing lines are surrounded with a jacket (11) so that they may be maintained at an optimum polymerization temperature by any means such as blowing heated air into the chamber. If the initiator used is $SO_2$ we prefer maintaining a temperature of about 40° C. but if $CO_2$ is used we prefer the temperature to be 50° C. The length of tubing and the number of tubing lines are adjusted to match the flow rate and the required polymerization time.

The solid rods (12) which emerge are then fed to a standard pellet cutter to form pellets. The pellets must then be washed to remove the alkali, unpolymerized monomer and the Q-salt. Both the monomer and the Q-salt may be removed and reused by methods disclosed in our copending application Ser. No. 039,773.

The following examples are intended to further illustrate the invention and are not intended to limit its scope:

EXAMPLE 1.

1140 grams (3.4 mols) of tetra n-butyl ammonium bisulfate was added to 7600 grams of purified 2-pyrrolidone and this solution was passed through a small laboratory wiped-film evaporator at a pressure of 10 mm mercury and a jacket temperature of 132° C. taking overhead about 10 percent of the 2-pyrrolidone along with the water to insure the formation of an anhydrous solution of the Q-salt which was collected at the bottom of the evaporator and contained about 80.5 mols of 2-pyrrolidone. 51.5 grams (0.8045 mol) of $SO_2$ was dissolved in this solution which was stored until the following solution was prepared in the same wiped-film evaporator.

1050 grams of a 50 percent aqueous solution of potassium hydroxide was added to 7600 grams of purified 2-pyrrolidone and this mixture passed through the wiped-film evaporator under reduced pressure to form an anhydrous solution of the K-salt. In addition to the water about 10 percent of the 2-pyrrolidone was also distilled overhead to insure the formation of an anhydrous solution containing about 9.4 mols of K-salt and 80.5 mols of 2-pyrrolidone.

Each solution was fed to a high pressure metering pump which delivered the solution to a static mixer. The pumps used were Milton-Roy Model No. MR1-33-32SM of the packed plunger type capable of developing pressures up to 7500 psi and metering from about 5 ml per minute to 50 ml per minute. All parts contacted by the solutions were made of stainless steel.

Each pump was adjusted to deliver 7.5 ml per minute of the solution to the manifold thus giving a flow rate of 15 ml per minute for the combined solutions. The manifold was a 1 inch stainless steel pipe capped at both ends with 4 inches between the caps. All tubing used for liquid flow to the manifold was heavy guage (0.049 in.) ¼ in. O.D. stainless steel. On the outlet side of the manifold there were attached 4 Teflon tubes, ⅛ inch inside diameter and 10 feet long. These tubes were not coiled but straight in order to minimize resistance to flow and were enclosed by means of a box constructed of Styrofoam (foamed polystyrene). Air heated to 40° C. was circulated through the box to maintain the optimum polymerization temperature.

The polymerized rods which emerged at the end of approximately one hour polymerization time were collected and cut into pellets by feeding them into a Wiley mill. After washing the pellets with water and drying the conversion was found to be 52 percent and the viscosity determined via the Gardner Bubble Tube method was 5.5 Stokes (tube "T") when measured as a 5% solution in 85% formic acid.

EXAMPLE 2.

The method of Example 1 was followed except that an equivalent amount of methyl tri n-butyl ammonium bisulfate was substituted for the tetra n-butyl ammonium bisulfate with essentially the same results.

EXAMPLE 3.

The method of Example 1 was followed except that an equivalent amount of tetra n-butyl ammonium sulfate was substituted for the tetra n-butyl ammonium bisulfate. After washing the conversion in the pellets was found to be 40 percent and the viscosity was 63 Stokes.

EXAMPLE 4.

The method of Example 1 was followed except that an equivalent amount of methyl tri n-butyl ammonium sulfate was used in place of the tetra n-butyl ammonium bisulfate. The results were the same as in Example 3.

EXAMPLE 5.

The apparatus described in Example 1 was modified to utilize only one high pressure metering pump. The anhydrous solutions of the K-salt and the Q-salt were mixed in a holding tank under dry nitrogen to protect them from atmospheric moisture and this mixture fed into one pump of the same type described in Example 1. The stainless steel tubing connected to the output of the pump contained a tee ahead of the static mixer through which was bled either $SO_2$ or $CO_2$ to initiate the polymerization. The feed rate from the single pump was adjusted to 15 ml per minute. Although no fine control by varying the feed rate of either the K-salt solution or the Q-salt solution is possible with this system, the results were essentially the same. Care was taken to adjust the concentrations of the K-salt and Q-salt solutions in the original mixture of optimum conditions and when this was done the polymerization rate (conversion) and the viscosity of the product was the same as that obtained in Example 1.

We claim:

1. A continuous process for polymerizing 2-pyrrolidone via the bulk polymerization method to form pellets comprising the steps of:
   (1) preparing an anhydrous catalyst solution of an alkali metal pyrrolidonate in 2-pyrrolidone, and
   (2) preparing an anhydrous accelerator solution of a quaternary ammonium salt the anion of which is selected from the group consisting of sulfate and bisulfate, and
   (3) mixing these two solutions and adding a polymerization initiator selected from the group consisting of $CO_2$ and $SO_2$, and
   (4) pumping the mixed solutions containing the initiator under pressure at a metered rate to a manifold to which are connected polymerization tubes maintained at a slightly elevated temperature, and
   (5) applying sufficient pressure by pumping to force the polymerizing mixture through the tubes, and
   (6) providing sufficient residence time in the tubes so that solid rods of polymer emerge from the open ends of the tubes, and
   (7) cutting the rods of polymerized 2-pyrrolidone thus formed into pellets.

2. The method according to claim 1 wherein the alkali metal salt in the anhydrous catalyst solution is potassium pyrrolidonate.

3. The method according to claim 1 wherein the quaternary ammonium salt in the anhydrous accelerator solution is tetra n-butyl ammonium bisulfate.

4. The method according to claim 1 wherein the quaternary ammonium salt in the anhydrous accelerator solution is methyl tri n-butyl ammonium bisulfate.

5. The method according to claim 1 wherein the quaternary ammonium salt in the anhydrous accelerator solution is tetra n-butyl ammonium sulfate.

6. The method according to claim 1 wherein the quaternary ammonium salt in the anhydrous accelerator solution is methyl tri n-butyl ammonium sulfate.

7. The method according to claim 1 wherein the polymerization initiator is $SO_2$ and the temperature in the polymerization tubes is maintained at about 40° C.

8. The method according to claim 1 wherein the polymerization initiator is $CO_2$ and the temperature in the polymerization tubes is maintained at about 50° C.

* * * * *